(12) United States Patent
Huang (10) Patent No.: US 11,772,727 B2
(45) Date of Patent: Oct. 3, 2023

(54) PLUGGING POSITION RECORDING DEVICE

(71) Applicant: YOTTA INNOVATION CO., LTD., Apia (WS)

(72) Inventor: Stella Huang, Taipei (TW)

(73) Assignee: YOTTA INNOVATION CO., LTD., Apia (WS)

( * ) Notice: Subject to any disclaimer, the term of this patent is extended or adjusted under 35 U.S.C. 154(b) by 298 days.

(21) Appl. No.: 17/321,986

(22) Filed: May 17, 2021

(65) Prior Publication Data

US 2022/0363331 A1    Nov. 17, 2022

(51) Int. Cl.
B62H 3/00 (2006.01)

(52) U.S. Cl.
CPC ...................... B62H 3/00 (2013.01)

(58) Field of Classification Search
CPC .... B62H 3/00; B60R 9/10; B60R 9/04; B60R 9/06
See application file for complete search history.

(56) References Cited

U.S. PATENT DOCUMENTS

| | | | |
|---|---|---|---|
| 5,423,566 A * | 6/1995 | Warrington | B60R 9/06 224/532 |
| 5,593,172 A * | 1/1997 | Breslin | B60D 1/155 280/491.5 |
| 6,502,845 B1 * | 1/2003 | Van Vleet | B60D 1/155 280/491.1 |
| 7,004,491 B1 * | 2/2006 | Allsop | B60D 1/52 280/491.2 |
| 7,717,455 B2 * | 5/2010 | Morris | B60D 1/07 280/491.5 |
| 8,079,612 B1 * | 12/2011 | Tambornino | B60D 1/241 280/491.5 |
| 9,981,513 B2 * | 5/2018 | Belinky | B60D 1/605 |
| 10,046,612 B1 * | 8/2018 | Garcia | B60D 1/241 |
| 2009/0115165 A1 * | 5/2009 | Coy | B60D 1/52 280/506 |
| 2012/0000952 A1 * | 1/2012 | Dreger | B60R 9/10 224/533 |
| 2014/0246467 A1 * | 9/2014 | Hein | B60R 9/06 224/400 |
| 2019/0193621 A1 * | 6/2019 | Ayoub | B62H 3/08 |
| 2019/0351720 A1 * | 11/2019 | Murray | B60D 1/40 |
| 2020/0171895 A1 * | 6/2020 | Corns | B60D 1/363 |
| 2022/0153205 A1 * | 5/2022 | Kuschmeader | B60R 9/06 |
| 2022/0161836 A1 * | 5/2022 | Winden | B62B 5/0003 |

* cited by examiner

Primary Examiner — Brian D Nash
(74) Attorney, Agent, or Firm — Muncy, Geissler, Olds & Lowe (57) ABSTRACT

A plugging position recording device is provided to be configured to be applied to a plunger of a bike carrier, and the plugging position recording device includes a sliding track and a recording unit. The sliding track is disposed on the plunger. The recording unit is positionably received and adjustable within the sliding track, and the recording unit is abutted against an end face of a trailer bar to mark a depth of the plunger inserted into the trailer bar.

9 Claims, 10 Drawing Sheets

FIG. 10

PLUGGING POSITION RECORDING DEVICE

BACKGROUND OF THE INVENTION

Field of the Invention

The present invention relates to a bike carrier, and more particularly to a plugging position recording device.

Description of the Prior Art

A bike carrier provides extra space for a car to carry a bike, and a user can drive the car to the suburb to ride a bike and enjoy a leisure time, or go to a special environment to participate in competitions or trainings. For cyclists who enjoy riding a bike everywhere, the bike carrier is one of the most important equipment. Usually, the bike carrier is inserted into a trailer bar at the rear of the car via a plunger, and then the bike carrier is fixed via a fixing member, so it is convenient to assemble or disassemble the bike carrier.

However, there are many kinds of trailer bars, and the positions of the through holes are different, so when the user wants to assemble the bike carrier, s/he needs to move the plunger and the trailer bar repeatedly to match the through holes of the plunger and the through holes of the trailer bar. In addition, the bike carrier is great in volume and weight, so it is tiring and time-consuming for the user to assemble the bike carrier.

The present invention has arisen to mitigate and/or obviate the afore-described disadvantages.

SUMMARY OF THE INVENTION

The major object of the present invention is to provide a plugging position recording device which can accurately mark a depth position of a plunger inserted into a trailer bar when a bike carrier is connected to a car for the first time. Therefore, when the plunger of the bike carrier is pulled off from the trailer bar and connected to the trailer bar again, the plunger can quickly reach the depth position predetermined and allow a fixing member to be smoothly connected the plunger and the trailer bar so as to save a lot of assembling time.

To achieve the above and other objects, a plugging position recording device is provided, configured to be applied to a bike carrier, the bike carrier includes a plunger and a carrying unit, the plunger is inserted into a bar opening of a trailer bar along a plugging direction, the carrying unit is for carrying a bike, and the plugging position recording device includes a sliding track and a recording unit. The sliding track extends along the plugging direction for being disposed on the plunger; and the recording unit is positionably received and adjustable within the sliding track, the recording unit protrudes beyond the plunger on a direction lateral to the plugging direction, and when the plunger is inserted into the trailer bar, the recording unit is abutted against an end face of the bar opening in the plugging direction.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
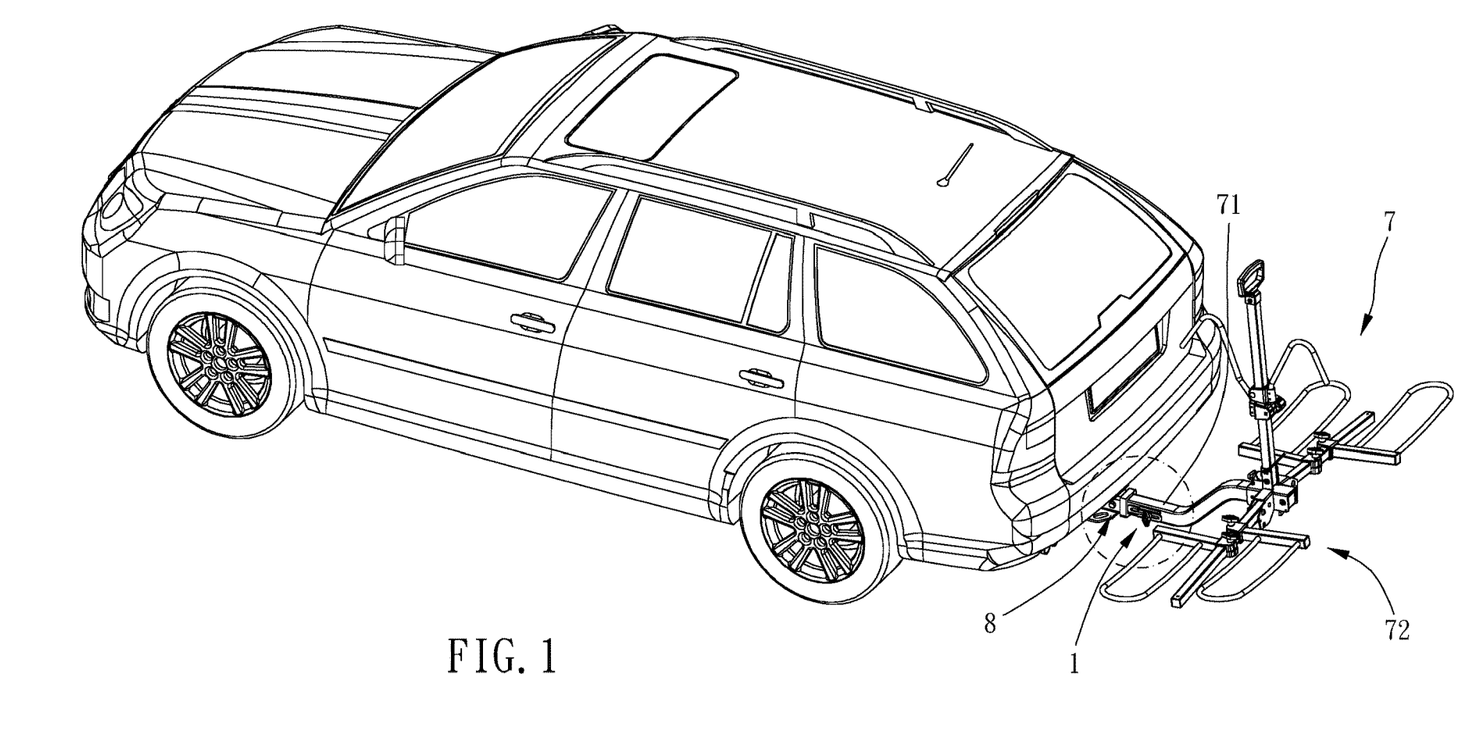
FIG. 1 is a drawing show an embodiment of the present invention in use.
Figure 2:
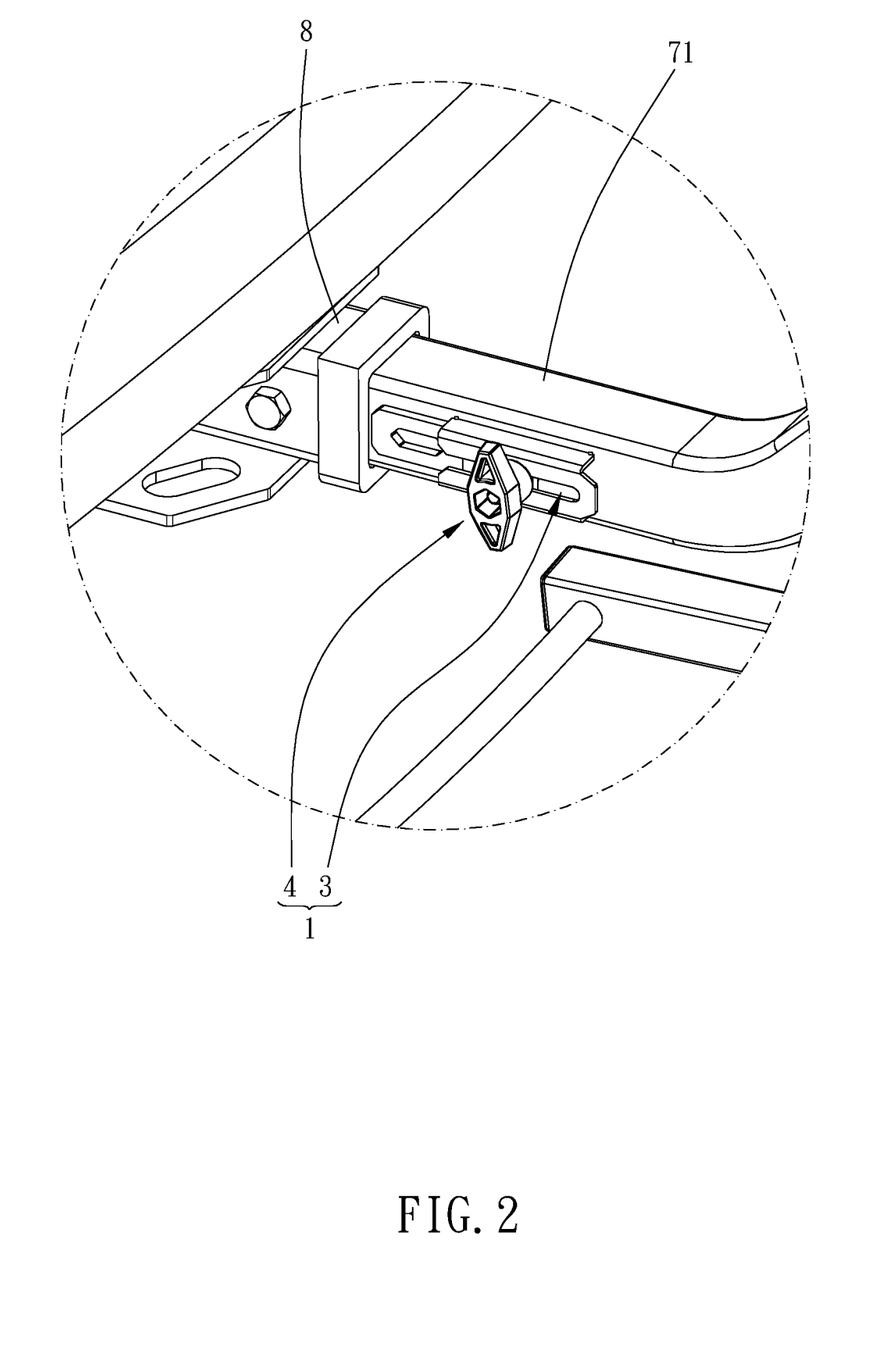
FIG. 2 is a partial enlarged view of FIG. 1.
Figure 3:
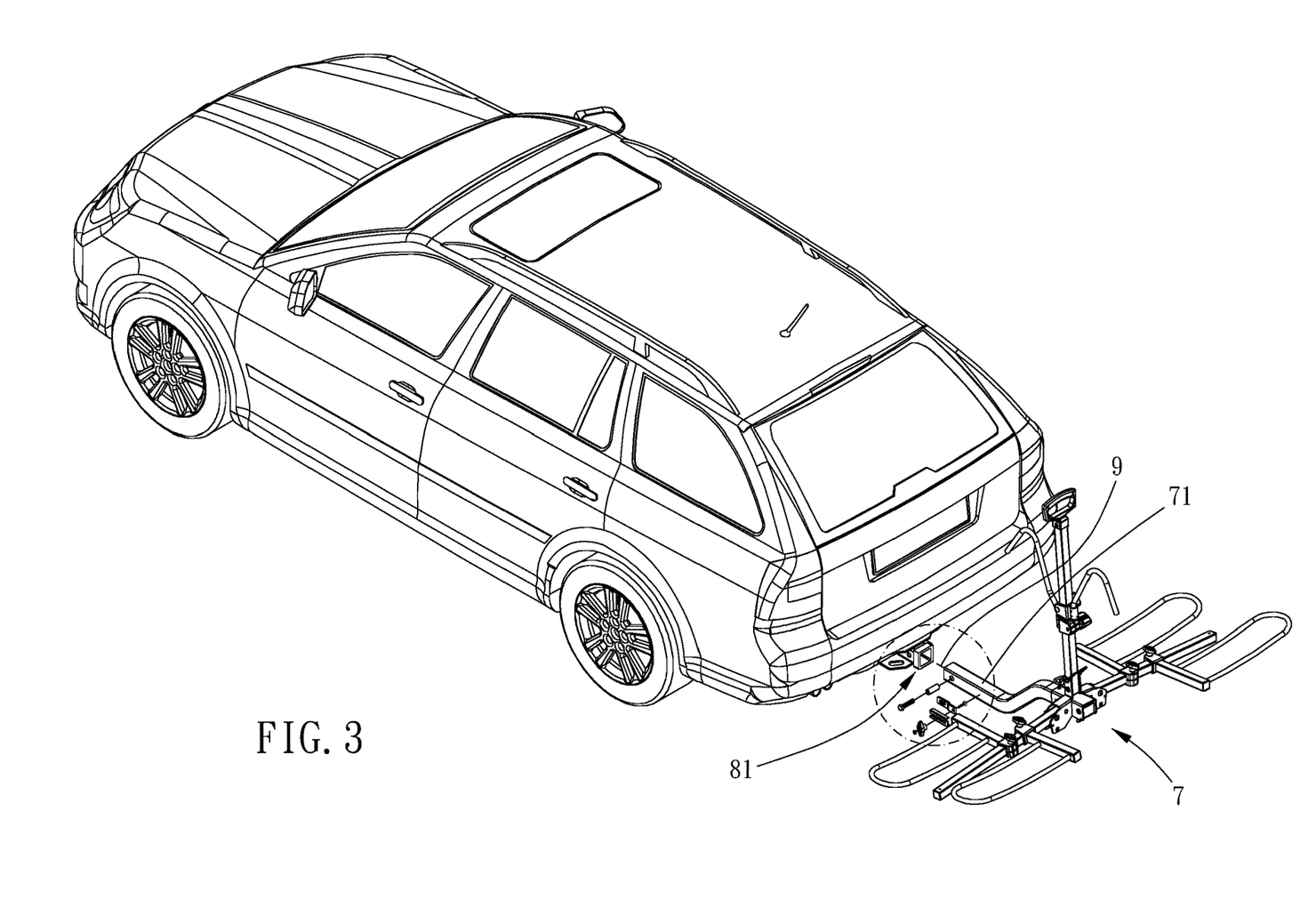
FIG. 3 is a partial breakdown view of the embodiment of the present invention.
Figure 4:
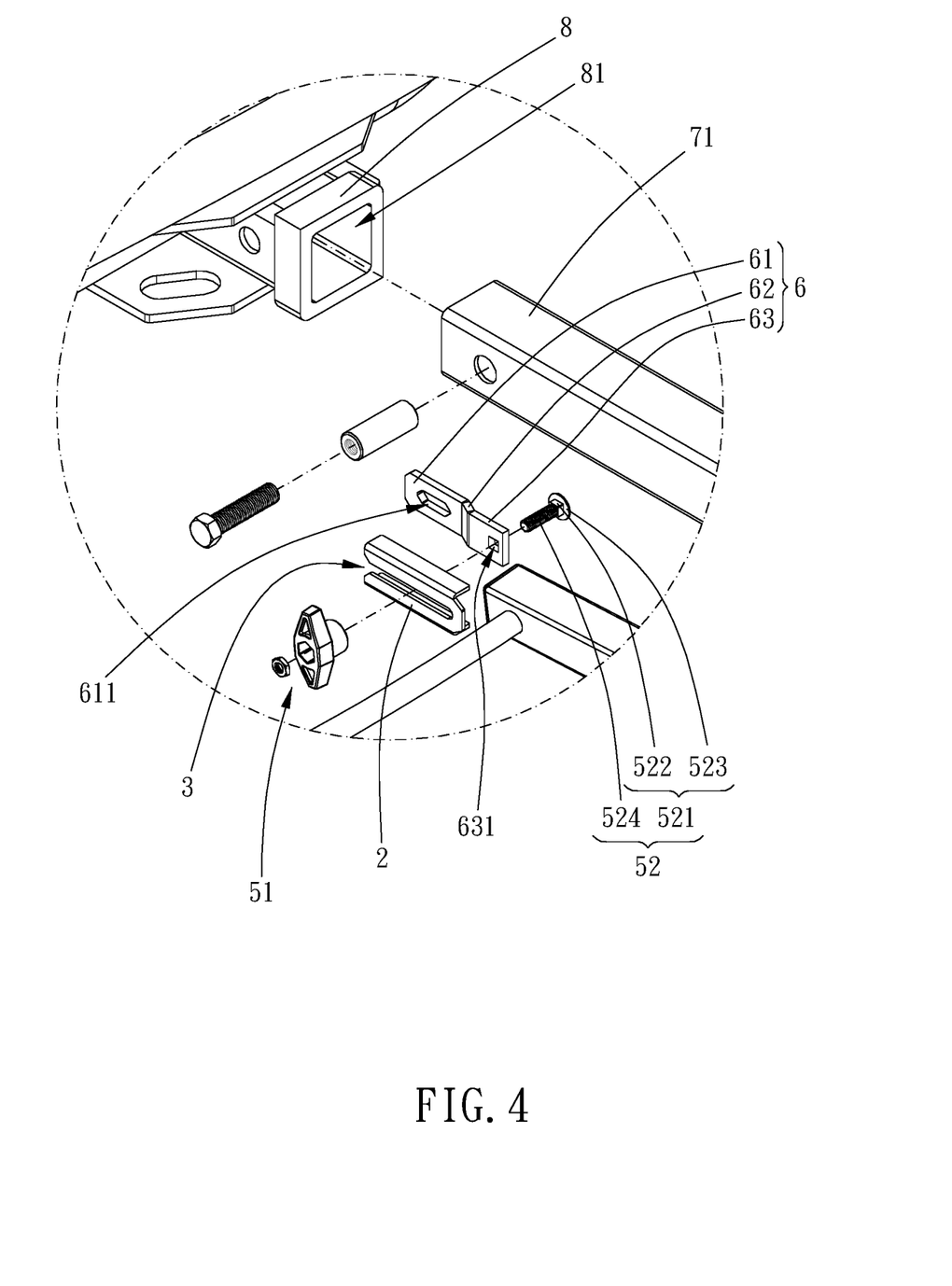
FIG. 4 is a partial enlarged view of FIG. 3.
Figure 5:
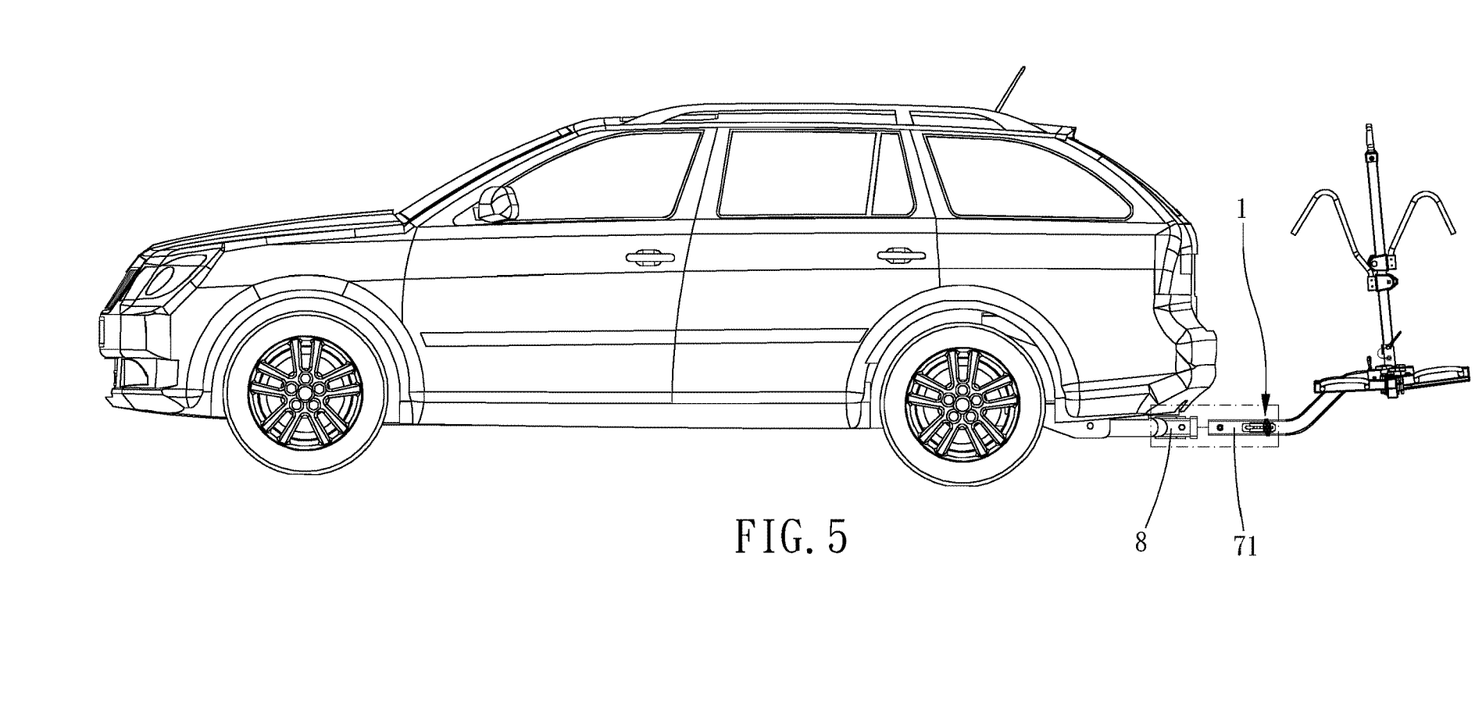
FIG. 5 is a drawing of a bike carrier being detached from a trailer bar of the embodiment of the present invention.
Figure 6:
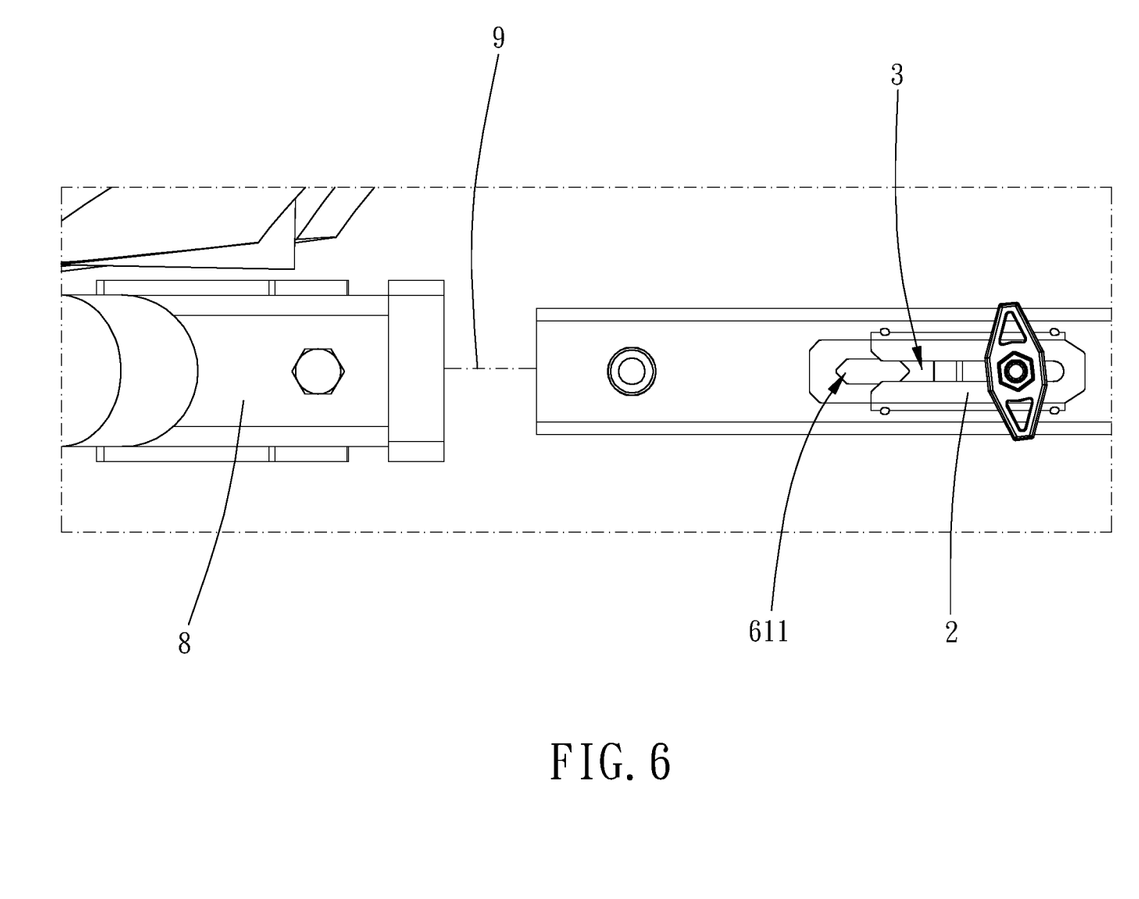
FIG. 6 is a partial enlarged view of FIG. 5.
Figure 7:
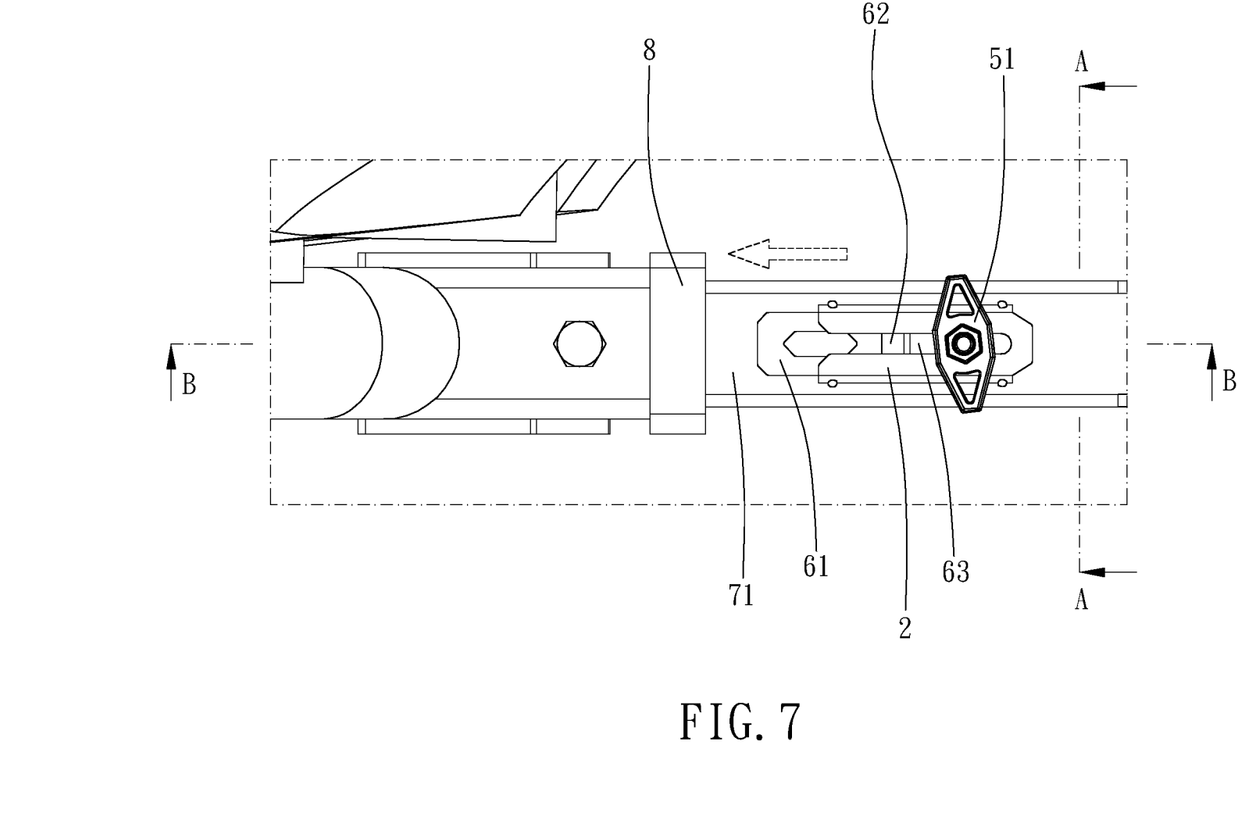
FIG. 7 is a drawing showing a plunger being inserted into the trailer bar and correspondingly connected of the embodiment of the present invention.
Figure 8:
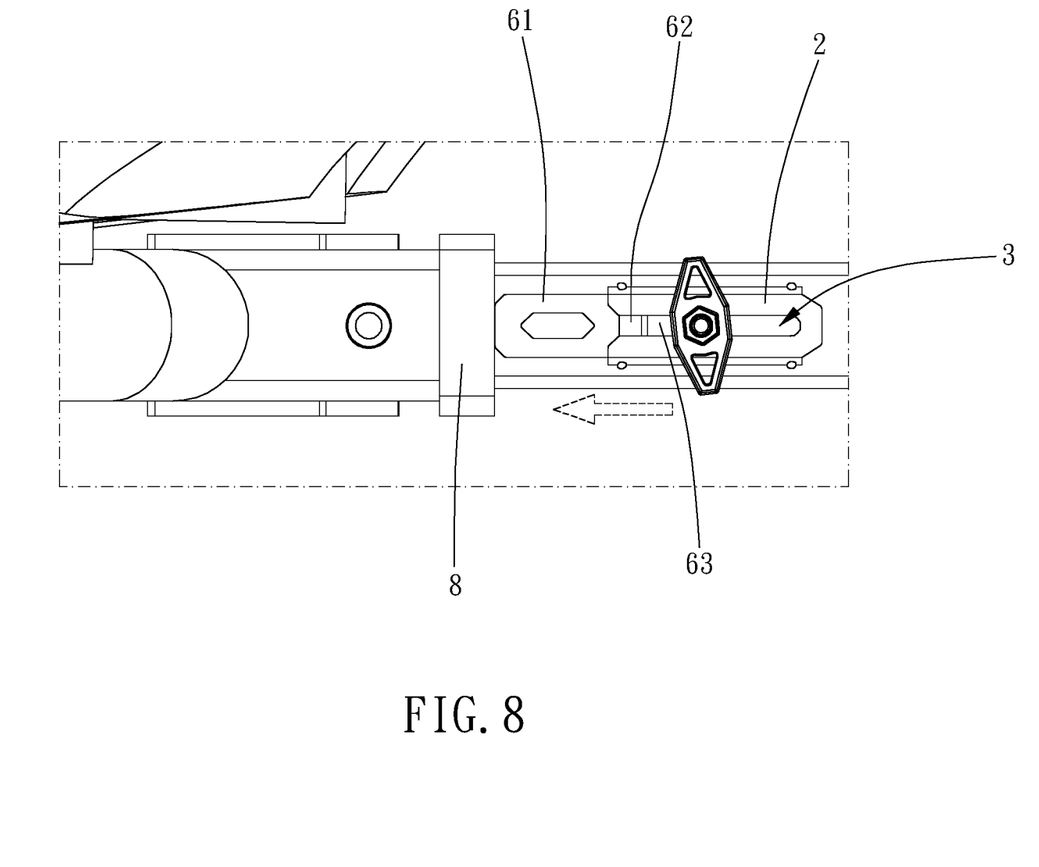
FIG. 8 is a recording unit abutted against an end face of a bar opening of the embodiment of the present invention.
Figure 9:
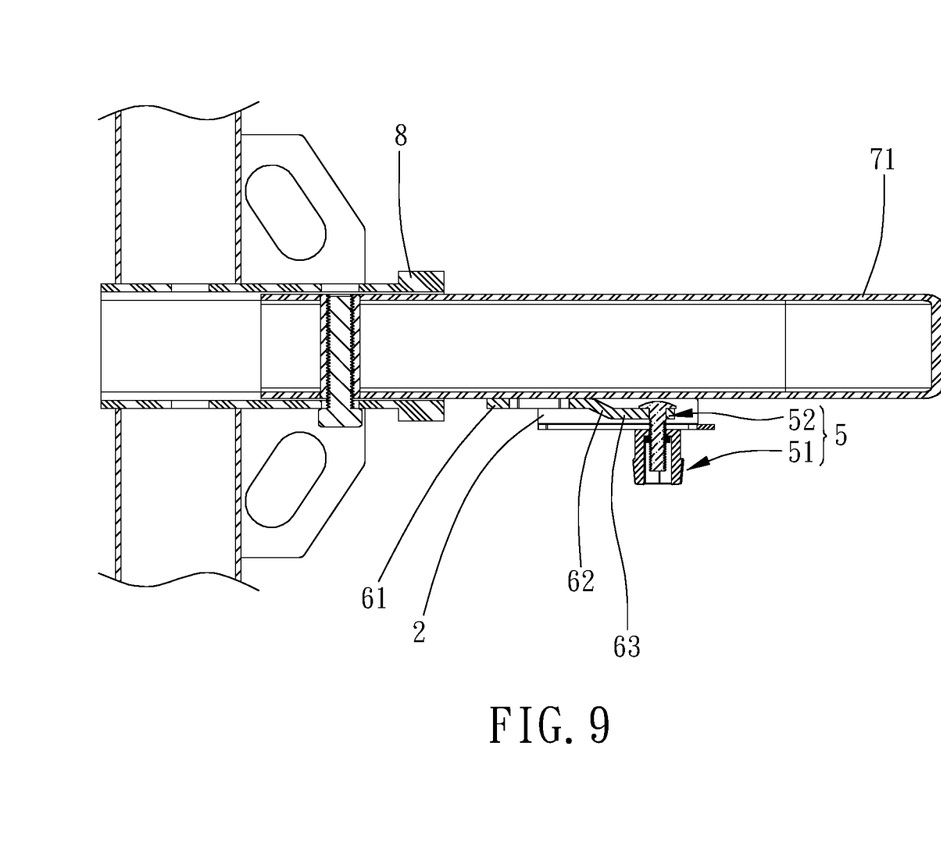
FIG. 9 is a cross-sectional view of FIG. 7, taken along line A-A.
Figure 10:
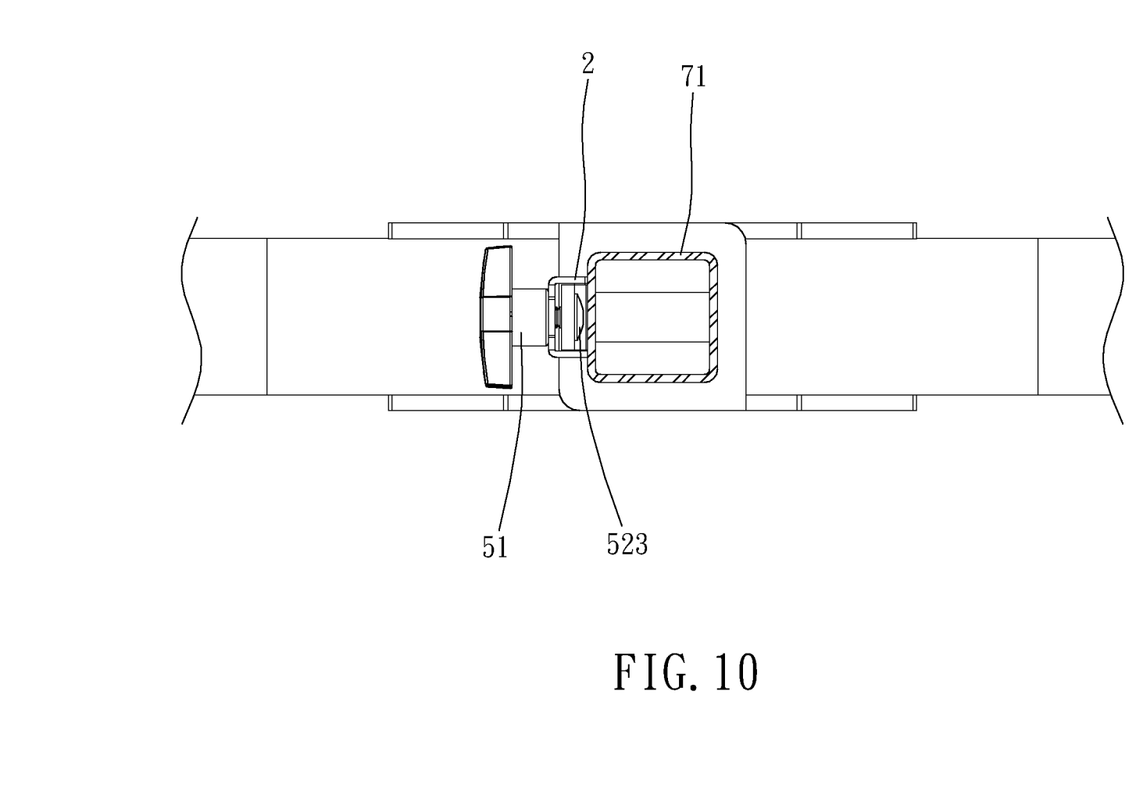
FIG. 10 is a cross-sectional view of FIG. 7, taken along line B-B.

Please refer to FIGS. 1 to 10 for an embodiment. A plugging position recording device 1 is configured to be applied to a bike carrier 7, the bike carrier 7 includes a plunger 71 and a carrying unit 72, the plunger 71 is inserted into a bar opening 81 of a trailer bar 8 along a plugging direction 9, the carrying unit 72 is for carrying a bike, and the plugging position recording device 1 includes a sliding track 3 and a recording unit 4.

The sliding track 3 extends along the plugging direction 9 for being disposed on the plunger 71, for example but not limited thereto, the sliding track 3 directly penetrates an embodiment of the plunger 71, or the sliding track 3 is connected to an embodiment of the plunger 71 via other objects, and both ways are included in this invention. In other embodiment, the plugging position recording device 1 further has a slide base 2, the slide base 2 is positioned on the plunger 71, and the slide base 2 has the sliding track 3 therethrough.

The recording unit 4 is positionably received and adjustable within the sliding track 3, the recording unit 4 protrudes beyond the plunger 71 on a direction lateral to the plugging direction 9, and when the plunger 71 is inserted into the trailer bar 8, the recording unit 4 is abutted against an end face of the bar opening 81 in the plugging direction 9. Therefore, when the plunger 71 is pulled off from the trailer bar 8 and assembled back again, a user needs to move the plunger 71 along the plugging direction 9 until the recording unit 4 is abutted against the end face of the bar opening 81 again which means a through hole of the plunger 71 corresponds to a through hole of the trailer bar 8, and the user can connect and position the plunger 71 and the trailer bar 8 via a fixing member.

Specifically, the recording unit 4 includes an operation assembly 5 and an abutting member 6 which is connected to the operation assembly 5, the operation assembly 5 is for being operated from an outside to drive the abutting member 6 to slide relative to the sliding track 3, and the abutting member 6 is abutted against the end face of the bar opening 81 in the plugging direction 9. More specifically, the operation assembly 5 includes a controlling member 51 and a connecting member 52, one of two sides of the connecting member 52 is connected to the abutting member 6, the other of the two sides of the connecting member 52 is disposed through the sliding track 3 to be connected to the controlling member 51, and the controlling member 51 is movable with the abutting member 6 so as to slide with the connecting member 52 along the sliding track 3.

In this embodiment, on an extension direction of the plugging direction 9, the sliding track 3 penetrates the slide base 2, so the sliding track 3 can be assembled to the slide track 2 through the connecting member 52 being connected to the controlling member 51 and the abutting member 6 first. In addition, as viewed from the plugging direction 9, the slide base 2 is upside-down U shaped to provide more allowance space to receive the abutting member 6. In addition, the slide base 2 and the abutting member 6 are preferably made of metal so as to have preferable strength, durability and service life, and the slide base 2 is wielded and positioned on the plunger 71.

The connecting member 52 includes a head portion 521 and a rod body 524 which is connected to the head portion 521, the head portion 521 radially protrudes beyond the rod body 524, a part of the head portion 521 is abutted against the abutting member 6 in an extension direction of the rod body 524, the controlling member 51 is rotatably screwed to the rod body 524, and on the extension direction of the rod body 524, the controlling member 51 and the head portion 521 clip on and are abutted against the slide base 2 and the abutting member 6. In other words, when the controlling member 51 is screwed to press the slide base 2 tightly, the abutting member 6 is unable to slide relative to the slide base 2; when the controlling member 51 is screwed to loosen the slide base 2, the user can drive the abutting member 6 to move via the controlling member 51; that is, the controlling member 51 can position and move the abutting member 6.

Specifically, the abutting member 6 has an insertion hole 631 therethrough, the head portion 521 includes an inserting portion 522 and a top portion 523 which is connected to the inserting portion 522, the inserting portion 522 is connected to the rod body 524, a profile of the insertion hole 631 corresponds to a profile of the inserting portion 522, the inserting portion 522 is inserted into the insertion hole 631, and the top portion 523 is abutted against the abutting member 6 in the extension direction of the rod body 524 so that the connecting member 52 is connected to the abutting member 6, and the connecting member 52 is movable with the abutting member 6 in the plugging direction 9 and the extension direction of the rod body 524. In this embodiment, a profile of the insertion hole 631 is non-circular, and the abutting member 6 is unrotatable relative to the connecting member 52 to ensure that a direction of the abutting member is fixed, and the abutting member 6 can precisely be abutted against the end face of the bar opening 81.

More specifically, the top portion 523 is curved, when the controlling member 51 is screwed loose, the connecting member 52 extends relatively, the head portion 521 moves away from the controlling member 51, and the top portion 523 is optionally abutted against the plunger 71. The curved structure is good for sliding smoothness and operation stability.

The abutting member 6 includes a first extended section 61, a tilted section 62 and a second extended section 63, the first extended section 61 and the second extended section 63 respectively extend horizontally, the tilted section 62 is slantly connected to and between the first and second extended sections 61, 63, and the second extended section 63 is closer to the sliding track 3 than the first extended section 61. The first extended section 61 is abutted against the plunger 71 and is abutted against the end face of the bar opening 81 in the plugging direction 9, the first extended section 61 can elevate a stability of relative sliding, the second extended section 63 is connected to the operation assembly 5, and the second extended section 63 and the plunger 71 are spacingly arranged to provide an allowance space to receive the head portion 521 and allow the head portion 521 to move therewithin.

In this embodiment, the abutting member 6 is bent and integrally made from a single plate, so the first extended section 61, the tilted section 62 and the second extended section 63 are continuously connected. In addition, the first extended section 61 has a lightening hole 611 therethrough, the lightening hole is hexagonal to decrease weight, and the second extended section 63 has the insertion hole 631 therethrough. On the plugging direction 9, a length of the first extended section 61 is at least 1.3 times a length of the second extended section 63, so a contact area abutted against the plunger 71 would be more to increase the sliding stability.

While we have shown and described various embodiments in accordance with the present invention, it should be clear to those skilled in the art that further embodiments may be made without departing from the scope of the present invention.

What is claimed is:

1. A plugging position recording device, configured to be applied to a bike carrier, the bike carrier including a plunger and a carrying unit, the plunger being inserted into a bar opening of a trailer bar along a plugging direction, the carrying unit for carrying a bike, the plugging position recording device including:
   a sliding track, extending along the plugging direction for being disposed on the plunger;
   a recording unit, positionably received and adjustable within the sliding track, the recording unit protruding beyond the plunger on a direction lateral to the plugging direction, wherein when the plunger is inserted into the trailer bar, the recording unit is abutted against an end face of the bar opening in the plugging direction; and
   a slide base, the slide base for being positioned on the plunger, the slide base having the sliding track therethrough.

2. The plugging position recording device of claim 1, wherein on an extension direction of the plugging direction, the sliding track penetrates the slide base.

3. The plugging position recording device of claim 1, wherein the recording unit includes an operation assembly and an abutting member which is connected to the operation assembly, the operation assembly is for being operated from an outside to drive the abutting member to slide relative to the sliding track, and the abutting member is abutted against the end face of the bar opening in the plugging direction.

4. The plugging position recording device of claim 3, wherein the operation assembly includes a controlling member and a connecting member, one of two sides of the connecting member is connected to the abutting member, the other of the two sides of the connecting member is disposed through the sliding track to be connected to the controlling member, and the controlling member is movable with the abutting member.

5. The plugging position recording device of claim 4, wherein the connecting member includes a head portion and a rod body which is connected to the head portion, the head portion radially protrudes beyond the rod body, a part of the head portion is abutted against the abutting member in an extension direction of the rod body, the controlling member is rotatably screwed to the rod body, and on the extension direction of the rod body, the controlling member and the head portion clip on and are abutted against the slide base and the abutting member.

6. The plugging position recording device of claim 5, wherein the abutting member has an insertion hole therethrough, the head portion includes an inserting portion and a top portion which is connected to the inserting portion, the inserting portion is connected to the rod body, a profile of the insertion hole corresponds to a profile of the inserting portion, the inserting portion is inserted into the insertion hole, and the top portion is abutted against the abutting member in the extension direction of the rod body.

7. The plugging position recording device of claim 3, wherein the abutting member includes a first extended section, a tilted section and a second extended section, the first extended section and the second extended section respectively extend horizontally, the tilted section is slantly connected to and between the first and second extended sections, and the second extended section is closer to the sliding track than the first extended section; wherein the first extended section is abutted against the plunger and is abutted against the end face of the bar opening in the plugging direction, and the second extended section is connected to the operation assembly.

8. The plugging position recording device of claim 7, wherein the abutting member is bent and integrally made from a single plate.

9. The plugging position recording device of claim 3, wherein on an extension direction of the plugging direction, the sliding track penetrates the slide base; the abutting member includes a first extended section, a tilted section and a second extended section, the first extended section and the second extended section respectively extend horizontally, the tilted section is slantly connected to and between the first and second extended sections, and the second extended section is closer to the sliding track than the first extended section; wherein the first extended section is abutted against the plunger and is abutted against the end face of the bar opening in the plugging direction, and the second extended section is connected to the operation assembly; the abutting member is bent and integrally made from a single plate; the slide base and the abutting member are made of metal; the slide base is wielded and positioned on the plunger; as viewed from the plugging direction, the slide base is upside-down U shaped; a profile of the insertion hole is non-circular; the first extended section has a lightening hole therethrough, and the second extended section has the insertion hole therethrough; the lightening hole is hexagonal; on the plugging direction, a length of the first extended section is at least 1.3 times a length of the second extended section; the top portion is curved, and the top portion optionally is abutted against the plunger.

\* \* \* \* \*